United States Patent [19]
Murray

[11] 3,920,308
[45] Nov. 18, 1975

[54] READY STORED POWER CORD
[76] Inventor: Harry C. Murray, 4417 Teays Valley Road, Scott Depot, W. Va. 25560
[22] Filed: Apr. 1, 1974
[21] Appl. No.: 456,773

[52] U.S. Cl. ............................ 339/119 C; 339/147 C
[51] Int. Cl.² ...................................... H01R 13/72
[58] Field of Search ............ 339/119 C, 123, 167 C, 339/148 L, 148 BR, 29 R, 2 RL, 5 RL, 6 R, 6 RL, 8 RL, 9 R

[56] References Cited
UNITED STATES PATENTS
3,566,332  2/1971  Bonhomme ................. 339/147 C X
3,689,868  9/1972  Snyder ....................... 339/147 C X Primary Examiner—Roy Lake
Assistant Examiner—E. F. Desmond
Attorney, Agent, or Firm—Clarence A. O'Brien; Harvey B. Jacobson

[57] ABSTRACT

A ready stored power cord assembly having a cord spool slidably arranged in a receptacle for movement between a position in which the spool is entirely within the receptacle and a position in which the spool is out of the receptacle. A plurality of spools, each provided with an associated power cord, may be arranged in a single receptacle. Electrical sockets connected to the cords are removably mountable in associated apertures provided in a cover which is pivotally mounted on the receptacle and functions as an electrical outlet cover plate when the cover is in a position blocking communication with the receptacle. Opening of the cover permits a spool or spools to be moved out of the receptacle and cord winding and unwinding accomplished as desired. When the spools are arranged within the receptacle they effectively function to store power cord wound on the spools, while power cords may be unwound from the spools to serve as extension cords, and the like, when the spools are positioned outside the receptacle.

9 Claims, 4 Drawing Figures

U.S. Patent  Nov. 18, 1975  3,920,308
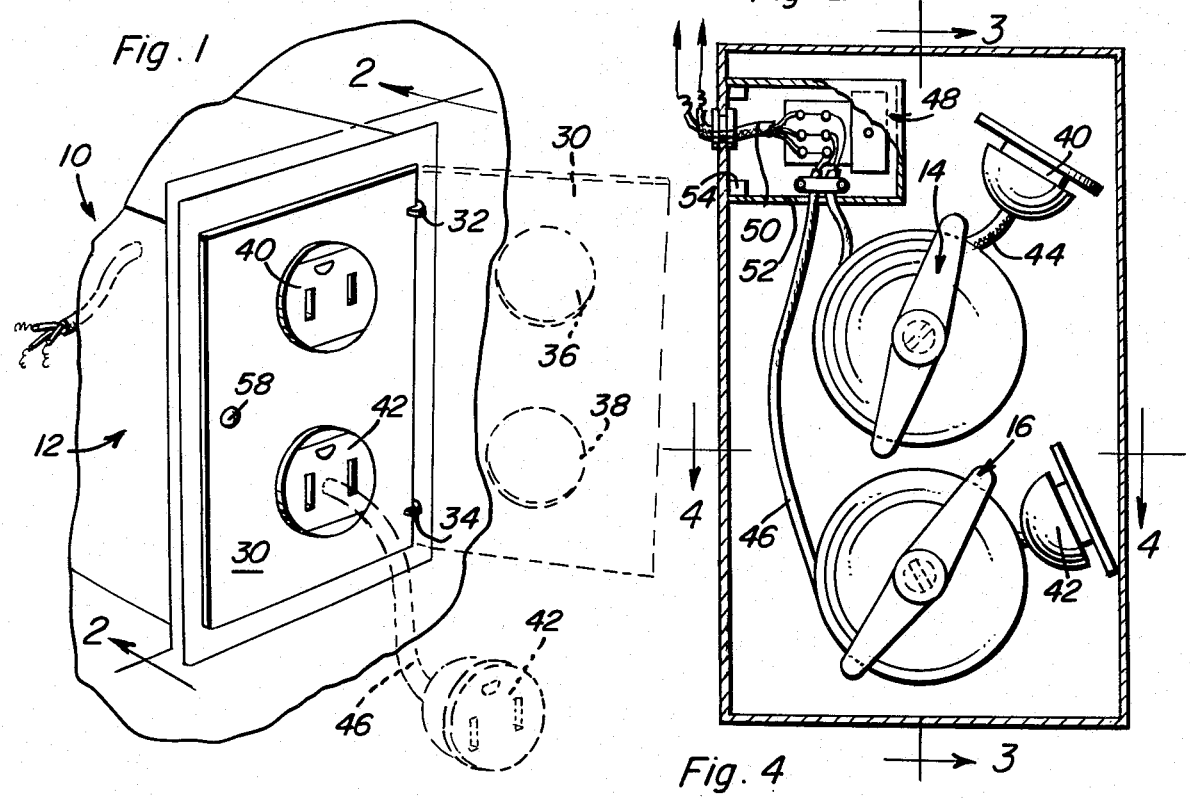
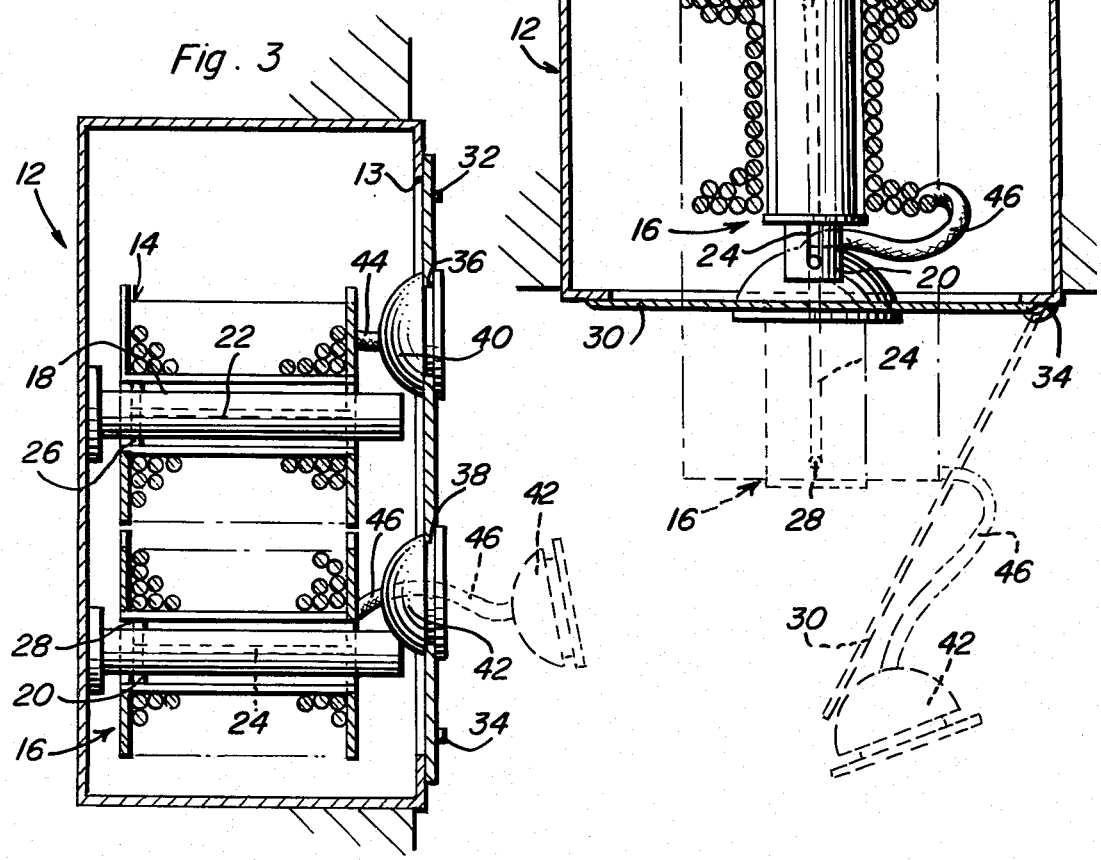

READY STORED POWER CORD

BACKGROUND OF THE INVENTION

1. Field of the Invention

This invention relates generally to the storage of power cords, and particularly to the storage of electrical extension cords, and the like.

2. Description of the Prior Art

For reasons of convenience, it is standard practice to run extension cords to electrical lamps and appliances, rather than move the lamps and appliances closer to an electrical outlet. The problem arises, however, of storing the cords when same are not being used.

U.S. Pat. No. 3,566,332, issued Feb. 23, 1971 to J. Bonhomme, discloses an electrical outlet receptacle cover plate on which is mounted a pair of reels. Power cord wound on the reels is unwound by pulling the cord through associated apertures provided in the cover plate, while electrical sockets connected to the ends of the cords are removably mountable in the apertures so that the combination of the sockets and cover plate forms a conventional electrical outlet when the power cords are not being used as extension cords.

SUMMARY OF THE INVENTION

It is an object of the present invention to provide an improved power cord storage assembly having simple, yet rugged construction.

It is another object of the present invention to provide a power cord storage assembly which may be installed at any location intended to receive an electrical outlet receptacle.

It is still another object of the present invention to provide an assembly for storing power cord which, although meeting all general safety requirements, permits the cords to be easily changed whenever wear or a specific application dictates.

These and other objects are achieved according to the present invention by providing an assembly having a receptacle provided with an opening, and a spool slidably arranged in the receptacle for movement through the opening between a position entirely within the receptacle and a position outside of the receptacle. A stud is advantageously mounted in the receptacle and arranged extending toward the opening of the receptacle for slidably receiving the spool. A slot is provided in the stud, with a guide pin provided on the spool being slidably inserted into the slot for permitting limited movement of the spool along the extent of the stud.

A cover pivotally arranged on the receptacle moves between a position blocking the receptacle opening and a position unblocking same. An aperture is provided in the cover for selectively receiving an electrical fitting connected to an end of a length of electrical power cord wrapped around the spool for storage thereon. The electrical fitting is advantageously an electrical socket. A covered terminal box arranged in the receptacle permits connection of the power cord to a conventional power supply.

According to a preferred embodiment of the present invention, a plurality of spools are slidably mounted in the receptacle. Each spool is provided with a respective power cord which may be used separately from the cords associated with the other spool or spools arranged in the receptacle.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, perspective view showing a power cord storage assembly according to the present invention.

FIG. 2 is a sectional view taken generally along the line 2—2 of FIG. 1.

FIG. 3 is a sectional view taken generally along the line 3—3 of FIG. 2.

FIG. 4 is a sectional view taken generally along the line 4—4 of FIG. 2.

DESCRIPTION OF THE PREFERRED EMBODIMENTS

Referring now more particularly to the drawings, an assembly 10 according to the present invention includes a receptacle 12 having in the manner of conventional electrical outlet boxes four side walls, a back wall, and an open front 13. A pair of spools 14 and 16 are slidably arranged in the receptacle 12 for movement through opening 13 between a position entirely within receptacle 12, the full line position shown in FIGS. 3 and 4 of the drawings, and a position outside of receptacle 12, as shown in broken lines in FIG. 4 of the drawings. Each spool 14, 16 has an associated stud 18 and 20, respectively, mounted on the back wall of receptacle 12 and arranged extending toward opening 13. Respective slots 22 and 24 are provided in studs 18, 20, with spools 14, 16 being provided with guide pins 26 and 28 slidably inserted into slots 22, 24 for permitting limited movement of spools 14, 16 along the extent of the studs 18, 20 on which the spools are mounted.

A cover 30 is pivotally mounted on receptacle 12 adjacent opening 13 as by conventional hinges 32 and 34. Although hinges 32, 34 are illustrated as rings arranged passing through holes provided in cover 30 and the peripheral flange portion of receptacle 12 which defines opening 13, it is to be understood that any standard hinge suitable for the purpose may be substituted for the illustrated hinges. In particular, any suitable, known arrangement (not shown) may be employed for retaining cover 30 in its full line position shown in FIG. 1 wherein the cover blocks opening 13. Hinges 32, 34 function to permit movement of cover 30 between a position blocking opening 13, the full line position of FIG. 1, and a position unblocking same, the broken line position of FIG. 1. Apertures 36 and 38 are provided in cover 30 for selectively receiving respective electrical sockets 40 and 42, or other suitable fittings. Sockets 40, 42 are provided with peripheral grooves which permit the sockets to snap into apertures 36 and 38 in the manner illustrated in FIG. 3 of the drawings. Conventional electrical power cords 44 and 46 are wrappable around respective spools 14 and 16 for storage thereon. Electrical sockets 40 and 42 are connected to cords 44, 46 as illustrated.

The ends of cords 44, 46 opposite the ends to which sockets 40, 42 are connected, are removably attached to appropriate terminals in a terminal box 48. A cord 50 connects other terminals of box 48 to an appropriate, conventional power source. For example, cord 50 may be the usual electrical power cord which runs into an electrical outlet receptacle for providing electrical power to the receptacle. A suitable cover 52 is advantageously arranged over abutments 54 suitably arranged on one of the walls of receptacle 12 to prevent persons, especially children, from being exposed to live wire connections when cover 30 is in its open, or broken line, position. Since the general construction of the connecting poles of the terminal box is well known and conventional, this construction will not be discussed in detail herein.

Cords 44 and 46 can be stored within receptacle 12 with their associated sockets 40, 42 snapped into apertures 36, 38. When the cords and sockets are arranged thusly, an assembly 10 may be used as a conventional wall outlet. When an extension cord is desired or required, cover 30 is moved to its open, or broken line position, and at least one of spools 14, 16 is moved out of receptacle 12 by sliding the spool along its associated stud 18, 20. The appropriate electrical socket 40, 42 may now be removed from aperture 36, 38 and cord 44, 46 unwound from the particular spool. Once sufficient cord has been pulled through its associated aperture, the door or cover 30 may be closed and the unwound cord employed as one would employ a conventional extension cord. One or both of the cords 44, 46 can be used at any time. It is to be understood, however, that more than two spools and associated cords could be provided if so desired.

Cover 30 may be selectively retained in place by any suitable, known device, with a conventional screw 58 being illustrated for this purpose.

As can be readily appreciated from the above description and from the drawings, an assembly according to the present invention has avoided mechanical parts which might be exposed to excessive wear and failure. Cover 30 can be easily opened to permit a selected cord spool to slide out where part or all of the associated power cord can be unwound as to the length needed so as to eliminate the usual excessive amount of cord which is usually just left lying around the floor. A power cord may be exchanged or replaced as desired and necessary, and the shape and size of the receptacle and associated cord carrying spools can be varied to meet specific requirements. An assembly 10 according to the present invention has varied applications, from ordinary lamps to all types of home appliances, and is flexible as to the kind and magnitude of voltage available, the amount of amperes needed, and the like. The assembly may be used in workshops and for actuating power tools. It can be installed in new or old residences, offices, shops, motels, hotels, factories, at any location where a regular electrical outlet receptacle was planned. An assembly according to the present invention can be installed to great advantage with only a slight increase in cost. Further, the covered terminal box prevents persons from being exposed to live wire connections when the cover of the receptacle is open.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A ready stored power cord assembly, comprising, in combination:
   a. a receptacle having a back wall and an opening opposite the back wall; and
   b. a spool slidably arranged in the receptacle for movement through the opening between a position entirely within the receptacle and a position outside of the receptacle, a stud being cantilever mounted on the back wall of the receptacle and arranged extending toward the opening, and a slot being provided in the stud, the spool being slidably mounted on the stud and provided with a guide pin slidably inserted into the slot for permitting limited sliding movement of the spool along the extent of the stud.

2. A ready stored power cord assembly, comprising, in combination:
   a. a receptacle having an opening;
   b. a spool slidably arranged in the receptacle for movement through the opening between a position entirely within the receptacle and a position outside of the receptacle, a stud being mounted in the receptacle and arranged extending toward the opening, and a slot being provided in the stud, the spool being provided with a guide pin slidably inserted into the slot for permitting limited movement of the spool along the extent of the stud, and
   c. a cover pivotally arranged on the receptacle for movement between a position blocking the opening and a position unblocking the opening, an aperture being provided in the cover for selectively receiving an electrical fitting.

3. A structure as defined in claim 2, further including an electrical power cord wrappable around the spool for storage thereon, and wherein the electrical fitting is an electrical socket connected to the power cord.

4. A structure as defined in claim 3, further including a terminal box arranged in the receptacle for connecting the power cord to a power supply.

5. A structure as defined in claim 4, wherein a plurality of spools are slidably mounted in the receptacle, a plurality of power cords are arranged one cord per spool, a plurality of electrical fittings are connected to the cords, and a plurality of apertures are provided in the cover, each of the apertures being arranged for receiving a one of the electrical fittings associated with a respective one of the spools.

6. A structure as defined in claim 3, wherein a plurality of spools are slidably mounted in the receptacle, a plurality of power cords are arranged one cord per spool, a plurality of electrical fittings are connected to the cords, and a plurality of apertures are provided in the cover, each of the apertures being arranged for receiving a one of the electrical fittings associated with a respective one of the spools.

7. A ready stored power cord assembly, comprising, in combination:
   a. a receptacle having an opening;
   b. a spool slidably arranged in the receptacle for movement through the opening between a position entirely within the receptacle and a position outside of the receptacle; and
   c. a cover pivotally arranged on the receptacle for movement between a position blocking the opening and a position unblocking the opening, an aperture being provided in the cover for selectively receiving an electrical 8. A structure as defined in claim 7, further including an electrical power cord wrappable around the spool for storage thereon.

9. A structure as defined in claim 8, further including a terminal box arranged in the receptacle for connecting the power cord to a power supply.

* * * * *